United States Patent
Huang et al.

(10) Patent No.: US 7,230,759 B2
(45) Date of Patent: Jun. 12, 2007

(54) AUTOSTEREOSCOPIC PROJECTION SCREEN

(75) Inventors: Wan-Jian Huang, Hsinchu (TW); Chao-Hsu Tsai, Hsinchu (TW); Kuo-Chung Huang, Hsinchu (TW)

(73) Assignee: Industrial Technology Research Institute (TW)

( * ) Notice: Subject to any disclaimer, the term of this patent is extended or adjusted under 35 U.S.C. 154(b) by 131 days.

(21) Appl. No.: 10/926,505

(22) Filed: Aug. 26, 2004

(65) Prior Publication Data

US 2005/0286126 A1  Dec. 29, 2005

(30) Foreign Application Priority Data

Jun. 25, 2004  (TW) .................. 93118514 A

(51) Int. Cl.
  *G02B 27/26* (2006.01)
  *G02B 27/22* (2006.01)
  *H04N 9/47* (2006.01)
(52) U.S. Cl. ............... 359/465; 359/462; 359/464; 348/57; 348/58; 353/8
(58) Field of Classification Search ............ 359/462, 359/465, 464; 353/7, 8; 348/54, 57, 58
See application file for complete search history.

(56) References Cited

U.S. PATENT DOCUMENTS

| 2,631,496 | A | * | 3/1953 | Rehorn | ............. 359/465 |
| 5,875,055 | A | * | 2/1999 | Morishima et al. | ......... 359/465 |
| 6,697,133 | B2 | * | 2/2004 | Fan et al. | ............. 349/98 |

OTHER PUBLICATIONS

Andrew Woods et al.; Proceedings Electronic Imaging Science and Technology; Entitled: Stereoscopic Displays and Virtual Reality Systems XI; SPEI vol. 5291; Jan. 19-22, 2004; pp. 285-292.

* cited by examiner

*Primary Examiner*—Audrey Chang
(74) *Attorney, Agent, or Firm*—Welsh & Katz, Ltd.

(57) ABSTRACT

An autostereoscopic projection screen with projection displays a stereoscopic image for receiving parallax images of right eye and left eye. The autostereoscopic projection screen includes a polarization-reserved diffuser, a microretarder, a polarizer, and a parallax element. Parallax images of right eye and left eye pass through the polarization-reserved diffuser and the microretarder for transferring their polarization states. Parallax images of right eye and left eye with specific polarization states will pass the polarizer and parallax element for dividing images of right eye and left eye from parallax images. The individual images separately enter viewing zones of right eye and left eye to generate the stereoscopic-image for viewers.

7 Claims, 4 Drawing Sheets

AUTOSTEREOSCOPIC PROJECTION SCREEN

BACKGROUND OF THE INVENTION

1. Field of Invention

The invention relates to an autostereoscopic screen and, in particular, to an autostereoscopic projection screen.

2. Related Art

The 3D display technology is considered the most research direction after planarization of the displays. The 3D visual effect is to enable a viewer to perceive from a two-dimensional source three-dimensional images as in daily life, i.e. perceiving depths and levels of objects. To display a 3D image, one has to provide two sets of overlapped images in one screen to simulate what two eyes perceive. The two eyes then receive the two sets of images via polarized glasses or gratings. However, the use of polarized glasses brings a lot of inconvenience in practice. To improve the image quality and to achieve the 3D display for naked eyes, many autostereoscopic screens have been invented to directly transmit two sets of images to the left and right eyes separately.

There are many ways to implement a stereoscopic display. A normal stereoscopic projection display uses two projectors to simultaneously provide two sets of images for the left and right eyes, respectively. The images are projected onto a screen with a Fresnel lens that has planar converging power. The action of the Fresnel lens is to deflect tilted incident light from the projector to be perpendicular to the screen. This prevents light from having different incident angles at different positions on the screen; otherwise, it may result in "hot spots" that are bright in the center but dark at the boundary. The two sets of images are then separately guided to the left and right eyes of the viewer to form a 3D image. However, this type of projection equipment does not have a good image quality. Moreover, the size of the structure is large. It is not easy to make a large-size projection screen and may involve a higher cost.

A double lenticular screen in the autostereoscopic projection screen can produce 3D effects too. In this case, both sides of a light diffuser are connected with a lenticular screen. Two projectors simultaneously transmit two sets of images for the left and right eyes, respectively. The image for the left eye passes through the double lenticular screen and enters completely into the left eye. Likewise, the image for the right eye has to be projected only to the right eye of the viewer. To achieve this effect, one had to impose a very stringent requirement on the double lenticular screen. The lenticular screens on both sides have to be completely symmetric. It takes a higher cost and difficult manufacturing process to achieve such a precision.

SUMMARY OF THE INVENTION

In view of the foregoing, an objective of the invention is to provide an autostereoscopic projection screen composed of a diffuser, a microretarder, a polarizer, and a parallax element. The optical system is designed so that the viewer can see 3D images without wearing special glasses. Moreover, the structure of the autostereoscopic projection screen can be simplified. This is good for increasing the display size and reducing the manufacturing cost of the screen.

The disclosed autostereoscopic projection screen simultaneously transmits parallax images for the left and right eyes. The parallax images have different polarization states, which are perpendicular to each other. The autostereoscopic projection screen includes a polarization-reserved diffuser, a microretarder, a polarizer, and a parallax element. The polarization-reserved diffuser is installed on the surface of the microretarder for the parallax images to pass through and maintain their polarization states. The microretarder contains a plurality of first phase delay zones and a plurality of second phase delay zones disposed in an interlacing fashion. The phase difference between the first phase delay zone and the second phase delay zone is one-half the wavelength. The parallax images for the left and right eyes go through the microretarder and have different polarization states. The polarizer allows specifically polarized parallax images to pass through. The parallax element has a specific distance from the microretarder to separate the parallax images for the left and right eyes so that the individual images separately enter viewing zones of the left and right eyes, respectively, to generate a stereoscopic-image for the viewer.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

According to the principle of the invention, the disclosed autostereoscopic projection screen can use either a parallax barrier plate or a microretarder as the parallax element.

Figure 1:
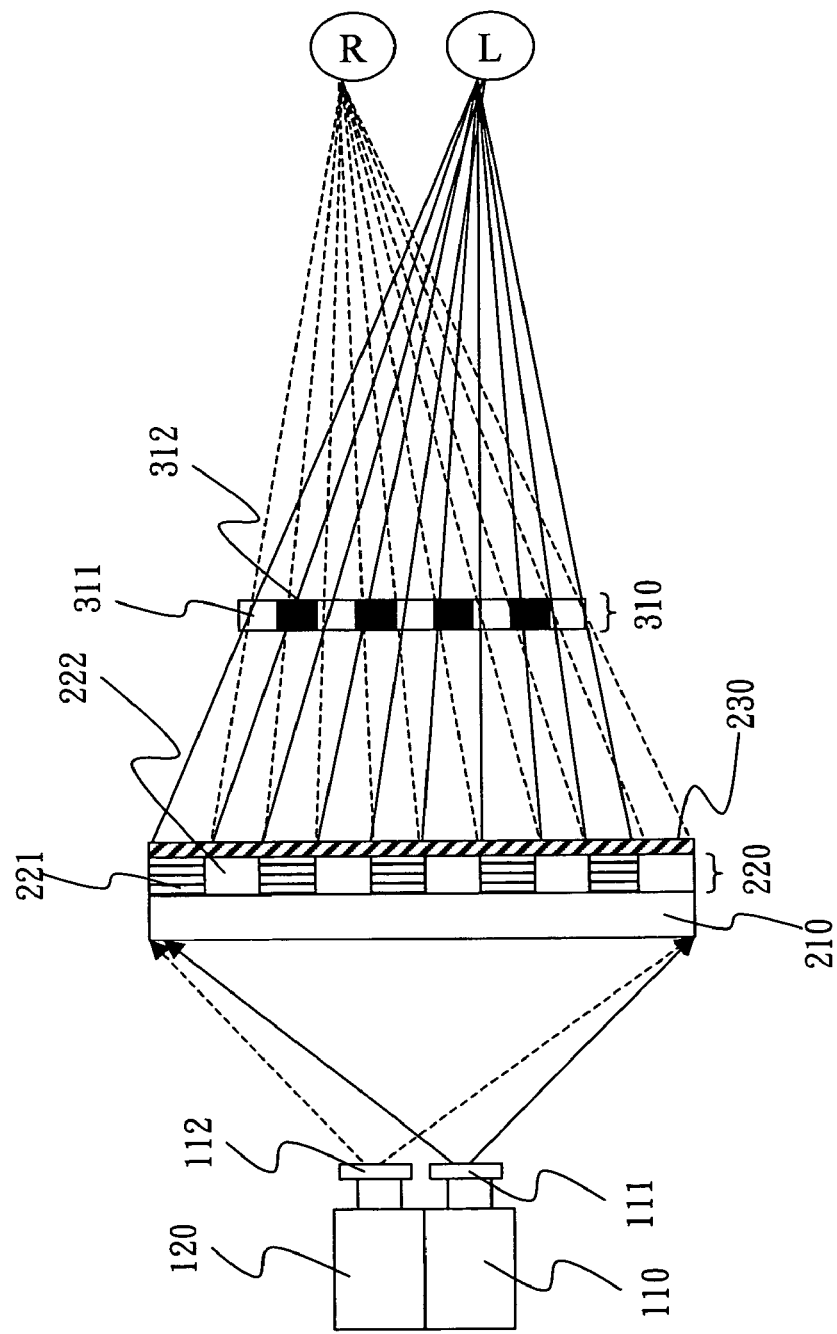
FIG. 1 is a schematic view of the first embodiment.

With reference to FIG. 1, a left projector 110 and a right projector 120 simultaneously provide parallax images for the left and right eyes, respectively. A P polarizer 111 and an S polarizer 112 let the parallax images from the left projector 110 and the right projector 120 become a P polarized image and an S polarized image, whose polarization states are perpendicular to each other. In a first embodiment, the disclosed autostereoscopic projection screen contains a polarization-reserved diffuser 210, a microretarder 220, a polarizer 230, and a parallax barrier plate. The polarization-reserved diffuser 210 is installed on the surface of the microretarder 220 for the parallax images to pass through and maintain their polarization states. The microretarder 220 contains a plurality of first phase delay zones 221 and a plurality of second phase delay zones 222 disposed in an interlacing and perpendicular fashion. The first phase delay zone 221 is a 0-wavelength plate, and the second phase delay zone 222 is a one-half-wavelength plate. The phase difference between them is thus one-half the wavelength. The polarizer 230 is a P polarizer for specifically polarized images to pass through the first phase delay zones 221 and the second phase delay zones 222, which polarizer 230 is installed with the side of the first microretarder 220 closer to the parallax element for specifically polarized images to pass through. The parallax barrier plate 310 has a specific distance from the microretarder 220. It has a plurality of orthogonal transparent zones 311 and opaque zones 312 to separate the parallax images for the left and right eyes. The individual images separately enter viewing zones L and R of the left and right eyes, respectively, to generate a stereoscopic image for the viewer. The widths of the transparent zones 311 and opaque zones 312 of the parallax barrier plate 310 are designed according to the specific distance from the parallax barrier plate 310 to the microretarder 220, corresponding to the width of the first phase delay zone 221 and the second phase delay zone 222.

With further reference to FIG. 1, let's take the P polarized image provided from the left projector 110 for the left eye as an example. When it is projected to the autostereoscopic projection screen, the part of image that goes through a first phase delay zone (0λ) 221 does not change its polarization. It is still P polarized and can go through the polarizer 230. It further passes through the parallax barrier plate 310 and enters the viewer's left eye zone L. When the rest part of left-eye parallax image passes through the second phase delay zone (λ/2) 222, its polarization is rotated by 90 degrees. Therefore, the rest part of image does not enter the right-eye zone R of the viewer. Likewise, the parallax image provided by the right projector 120 is an S polarized image. When it is projected to the autostereoscopic projection screen, the part of image that goes through a first phase delay zone (0λ) 221 does not change its polarization. It is still S polarized and cannot go through the polarizer 230. Therefore, the part of image does not enter the left-eye zone L of the viewer. When the rest part of right-eye parallax image passes through the second phase delay zone (λ/2) 222, its polarization is rotated by 90 degrees, becoming P polarized. Therefore, the rest part of image can enter the right-eye zone R of the viewer.

Figure 2:
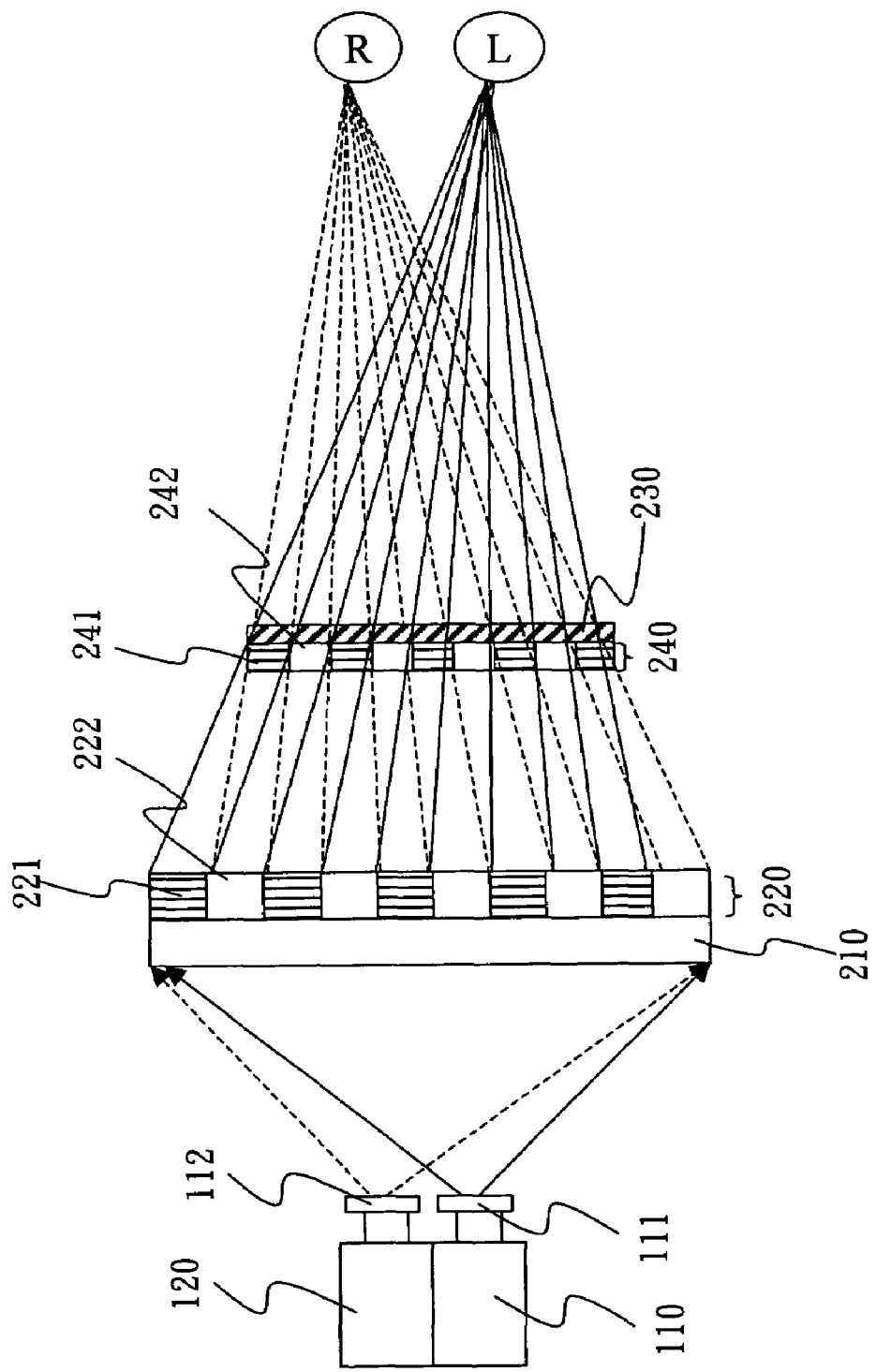
FIG. 2 is a schematic view of the second embodiment.

In a second embodiment of the invention, a microretarder is used as the parallax element. With reference to FIG. 2, the autostereoscopic projection screen contains a polarization-reserved diffuser 210, a first microretarder 220, a polarizer 230, and a second microretarder 240. The polarization-reserved diffuser 210 is installed on the surface of the first microretarder 220 for the parallax images to pass through and maintain their polarization states. The first microretarder 220 contains a plurality of first phase delay zones 221 and a plurality of second phase delay zones 222 disposed in an interlacing and perpendicular fashion. The first phase delay zone 221 is a 0-wavelength plate, and the second phase delay zone 222 is a one-half-wavelength plate. The phase difference between them is thus one-half the wavelength. The polarizer 230 is a P polarizer for specifically polarized images to pass through the first phase delay zones 221 and the second phase delay zones 222, which polarizer 230 is installed with the side of the second microretarder 240 closer to the viewer for specifically polarized images to pass through. The second microretarder 240 has a specific distance from the first microretarder. It also has a plurality of first phase delay zones 221 and a plurality of second phase delay zones 222 disposed in an interlacing and perpendicular fashion. The widths of the phase delay zones are designed according to the specific distance between the second microretarder 240 to the first microretarder 220, corresponding to the width of the first phase delay zone 221 and the second phase delay zone 222 of the first microretarder.

As shown in FIG. 2, the image entering the left-eye zone L has to pass twice the first phase delay zones 221, 241 or twice the second phase delay zones 222, 242. The image entering the right-eye zone R pass the first phase delay zones 221, 241 and twice the second phase delay zones 222, 242. Let's take the P polarized image provided from the left projector 110 for the left eye as an example. When it is projected to the autostereoscopic projection screen, the image that goes through twice the first phase delay zones (0λ) 221, 241 or twice the second phase delay zones (λ/2) 222, 242 does not change its polarization. It is still P polarized and can go through the polarizer 230 and enters the viewer's left eye zone L. When the left-eye parallax image travels toward the right-eye zone R Likewise, the parallax image provided by the right projector 120 is an S polarized image. When it is projected to the autostereoscopic projection screen, the image that travels toward the right-eye zone R has to go through the first phase delay zone (0λ) and the second phase delay zone (λ/2). Its polarization is rotated by 90 degrees, turning it into a P polarized image that can go through the polarizer 230. Therefore, the image can reach the right-eye zone R of the viewer. A feature of this embodiment is that both parallax images can be fully utilized, achieving full resolution for both left and right eyes.

Moreover, the polarizer can be removable such that the disclosed autostereoscopic projection screen is in a 3D mode when the polarizer is inserted while in a 2D mode when it is removed. One can also use an electro-optical device that can be switched between a linear polarization mode and a circular polarization mode as the polarizer such that the disclosed autostereoscopic projection screen is in a 3D mode when it is linearly polarized and a 2D mode when it is circularly polarized.

Figure 3:
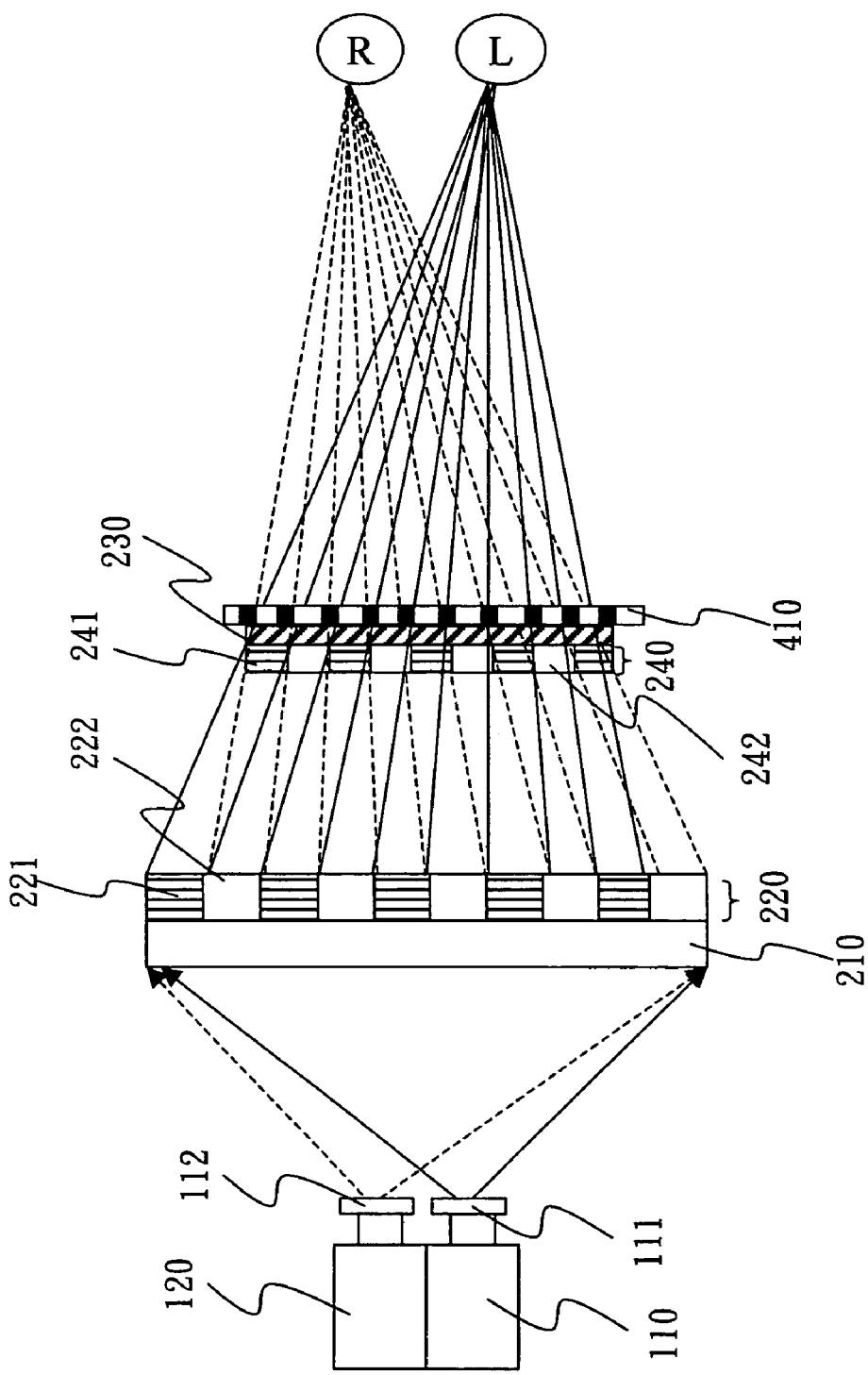
FIG. 3 is a schematic view of the third embodiment.
Figure 4:
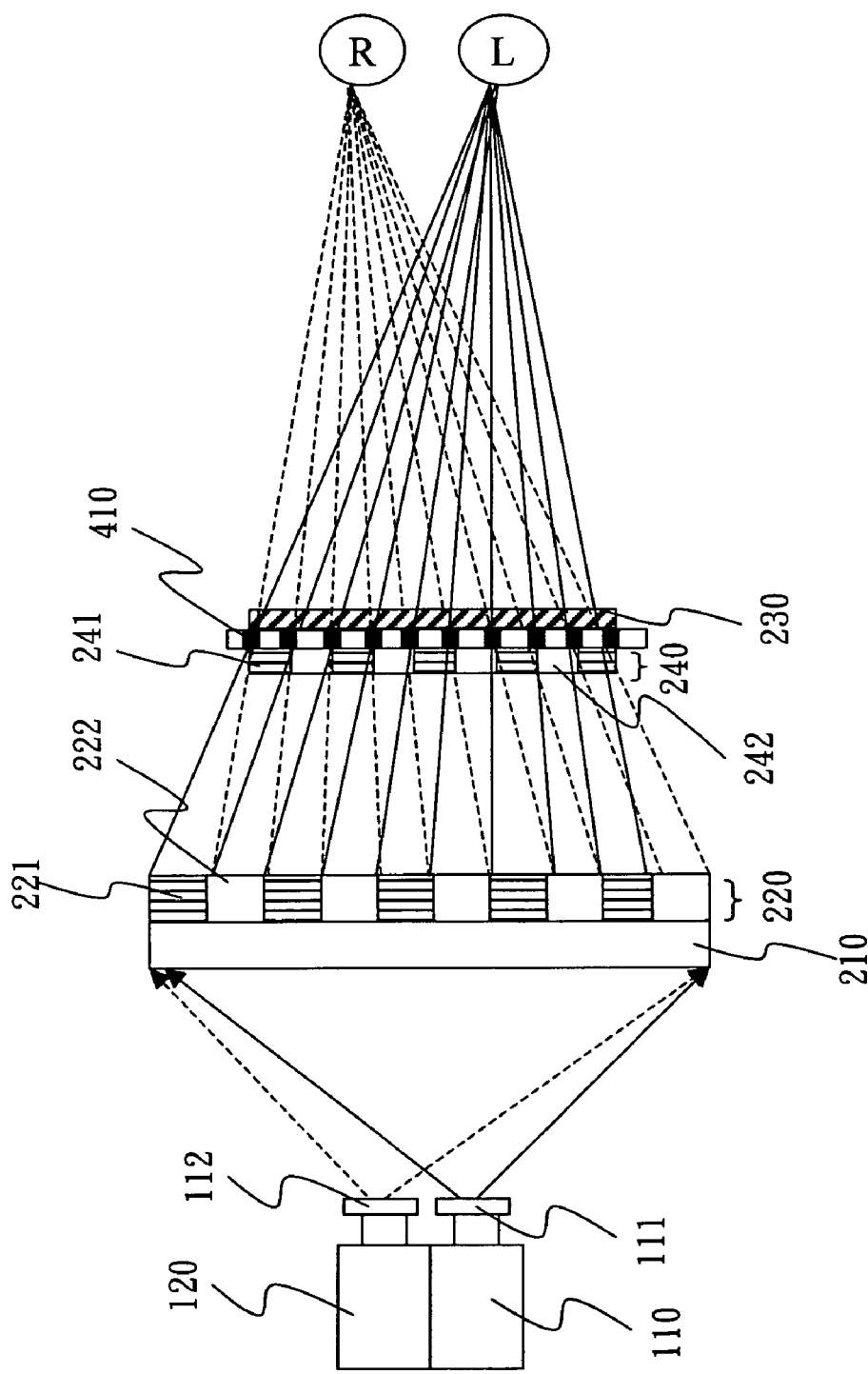
FIG. 4 is a schematic view of the fourth embodiment.

To prevent optical leakage, the autostereoscopic projection screen using a second microretarder as the parallax element can further include a black matrix as a mask to reduce the occurrence of ghost images and enhance the image quality. FIG. 3 shows a third embodiment of the invention. It is built based upon the second embodiment, but includes in addition a black matrix 410. The autostereoscopic projection screen includes a polarization-reserved diffuser 210, a first microretarder 220, a polarizer 230, a second microretarder 240, and a black matrix 410. The black matrix 410 is installed on the surface of the polarizer 230 closer to the viewer to prevent optical leakage from the connection of the first phase delay zone 241 and the second phase delay zone 242.

Certain variations would be apparent to those skilled in the art, which variations are considered within the spirit and scope of the claimed invention.

What is claimed is:

1. An autostereoscopic projection screen simultaneously providing parallax images for left and right eyes of viewers, a right projector installed with a first polarizer, left projector installed with a second polarizer allowing polarization states of the parallax images from the left projector and the right projector, the polarization states of the parallax images being perpendicular to each other, and the distance between the autostereoscopic projection screen and the projector being adjustable by the users, the autostereoscopic projection screen comprising:

a first microretarder, which allows the parallax images to pass through and contains a plurality of first phase delay zones and a plurality of second phase delay zones disposed in an interlacing way, wherein the phase difference between the first phase delay zone and the second phase delay zone is 180 degrees;

a polarization-reserved diffuser, which is installed on a first surface of the first microretarder for the parallax images to pass through and maintain their polarizations;

a third polarizer, which allows specifically polarized images to pass through the first phase delay zones and the second phase delay zones, wherein the third polarizer is installed either at a side of the first microretarder closer to a parallax element or at a side of the parallax element closer to the viewer for specifically polarized images to pass through; and the parallax element, which has a specific distance from the first microretarder to separate the parallax images for the left and right eyes so that the left-eye parallax image and the right-eye parallax image enter a left-eye zone and a right-eye zone of the viewer, respectively.

2. The autostereoscopic projection screen of claim 1, wherein the parallax element is a second microretarder with a plurality of first phase delay zones and a plurality of second phase delay zones disposed in an interlacing way corresponding to the first microretarder as the third polarizer is installed at the side of the parallax element closer to the viewer.

3. The autostereoscopic projection screen of claim 2 further comprising a black matrix on a surface of the third polarizer closer to the viewer.

4. The autostereoscopic projection screen of claim 2 further comprising a black matrix between the second microretarder and the third polarizer.

5. The autostereoscopic projection screen of claim 2, wherein the third polarizer is a removable type.

6. The autostereoscopic projection screen of claim 2, wherein the third polarizer is an electro-optical device with a linear polarization mode and a circular polarization mode.

7. An autostereoscopic projection screen simultaneously providing parallax images for left and right eyes of viewers, a right projector installed with a first polarizer, a left projector installed with a second polarizer allowing the polarization states of the parallax images from the left projector and the right projector, the polarization states of the parallax images being perpendicular to each other, and the distance between the autostereoscopic projection screen and the projector being adjustable by the users, the autostereoscopic projection screen comprising:

a first microretarder, which allows the parallax images to pass through and contains a plurality of first phase delay zones and a plurality of second phase delay zones disposed in an interlacing way, wherein the phase difference between the first phase delay zone and the second phase delay zone is 180 degrees;

a polarization-reserved diffuser, which is installed on a first surface of the first microretarder for the parallax images to pass through and maintain their polarizations;

a third polarizer, which allows specifically polarized images to pass through the first phase delay zones and the second phase delay zones wherein the polarizer is installed on a second surface of the first microretarder for specifically polarized images to pass through; and a parallax element, which has a specific distance from the first microretarder to separate the parallax images for the left and right eyes so that the left-eye parallax image and the right-eye parallax image enter a left-eye zone and a right-eye zone of the viewer, respectively wherein the parallax element is a parallax barrier plate with a plurality of transparent zones and a plurality of opaque zones disposed in an interlacing way and corresponding to the first phase delay zones and the second phase delay zones, respectively.

* * * * *